United States Patent [19]

Schneider et al.

[11] 4,336,025
[45] Jun. 22, 1982

[54] COMPOSITION CONTAINING COLORANTS AND ESTERIFIED OXALKYLATES OF AROMATIC HYDROXY COMPOUNDS

[75] Inventors: Manfred Schneider, Eppstein; Hubert Kruse, Kelkheim; Konrad Opitz, Liederbach, all of Fed. Rep. of Germany

[73] Assignee: Hoechst Aktiengesellschaft, Frankfurt am Main, Fed. Rep. of Germany

[21] Appl. No.: 271,569

[22] Filed: Jun. 8, 1981

[30] Foreign Application Priority Data

Jun. 10, 1980 [DE] Fed. Rep. of Germany ....... 3021712

[51] Int. Cl.$^3$ .................. C09B 67/10; D06P 67/00
[52] U.S. Cl. ........................................ 8/527; 8/583; 8/650; 8/662; 560/130
[58] Field of Search ................ 8/527, 583, 650, 662

[56] References Cited

U.S. PATENT DOCUMENTS 4,286,960  9/1981  Schneider et al. ............... 8/527

Primary Examiner—A. Lionel Clingman
Attorney, Agent, or Firm—Curtis, Morris & Safford

[57] ABSTRACT

Water-soluble compounds of the formula

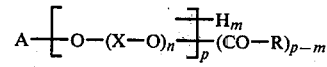

wherein A is an aryl radical, X represents identical or different groups of the formula —CH$_2$—CH$_2$— and —CH$_2$—CH(CH$_3$)—, R—CO— denotes identical or different radicals of a carboxylic acid having up to 22 C atoms, n represents identical or different numbers from 8 to 150, p is a number from 1 to 10 and m represents 0 up to (p-0.5), are suitable for the preparation of colorants, particularly disperse dyestuffs or vat dyestuffs.

9 Claims, No Drawings

COMPOSITION CONTAINING COLORANTS AND ESTERIFIED OXALKYLATES OF AROMATIC HYDROXY COMPOUNDS

The invention relates to the use of water-soluble compounds of the formula I $$A \!-\!\left[\!O\!-\!(X\!-\!O)_n\!-\!\right]_{\!p}\!\!\!\begin{array}{c}H_m\\(CO\!-\!R)_{p-m}\end{array} \quad (I)$$

wherein A is an aryl radical, X represents identical or different groups of the formula —CH$_2$—CH$_2$— and —CH$_2$—CH(CH$_3$)—, R—CO— denotes identical or different radicals of a carboxylic acid having up to 22 C atoms, n represents identical or different numbers from 8 to 150, p is a number from 1 to 10 and m represents 0 up to (p-0.5), for the preparation of colorants, and also to the corresponding colorant preparations which contain water-soluble compounds of the formula I.

The compounds of the formula I can be prepared by partial or complete esterification of oxyalkylates of the formula II $$A\!-\!\!\left[O\!-\!(X\!-\!O)_n\!-\!H\right]_p \quad (II)$$

wherein A, X, n and p have the meanings mentioned above, with a carboxylic acid of the formula III $$R\!-\!COOH \quad (III)$$

in which R has the meaning mentioned above, with a halide of this acid, particularly the acid chloride, or with a corresponding acid anhydride or with a mixture of 2 or more agents which introduce the radical R—CO—. This esterification is effected by methods which are in themselves known, if appropriate with the addition of a suitable catalyst. The compounds of the formula I are therefore also described in the following text as "esterification products".

The oxyalkylates of the formula II can be prepared by reacting phenols of the formula IV $$A\!-\!(OH)_p \quad (IV)$$

with ethylene oxide and/or propylene oxide.

For use in accordance with the invention, products of the formula I which have a good solubility in water, preferably at least 100 g/l, are selected, and the hydrophilic and hydrophobic groups in the molecule are adjusted to one another depending on the intended end use. This adjustment is effected by selection of the phenolic compound IV, the type and quantity of the alkylene oxide and the type and quantity of the acylating agent.

The starting phenols of the formula IV can contain one or more aromatic nuclei, and multinuclear phenols can contain condensed or non-condensed ring systems. In the case of non-condensed ring systems, the aromatic nuclei are linked by direct bonds or divalent groups, for example oxygen atoms, sulfone groups or aliphatic bridges, in particular lower alkylene bridges. The aromatic nuclei in these compounds can be unsubstituted or can contain up to three identical or different substituents, preferably alkyl groups having up to 16 carbon atoms, lower phenylalkyl groups or halogen atoms, particularly chlorine atoms. Particularly preferred multinuclear phenols are novolacs which are obtained by reacting phenols, preferably mononuclear phenols, in particular alkylphenols, with lower alkanals, particularly formaldehyde. Other preferred multinuclear phenols are di-(hydroxyphenyl)-methane, di-(hydroxyphenyl)-propane and di-(hydroxybiphenyl), and, amongst the condensed multinuclear phenols, 1-naphthol and 2-naphthol. Preferred mononuclear phenols are phenol, resorcinol, benzylphenol, phenethylphenol, chlorophenol, p-tert.-butylphenol, tributylphenol, octylphenol, nonylphenol or dodecylphenol.

Ethylene oxide is preferred as the alkylene oxide, in order to achieve the desired solubility in water; for the same reason, if the ethylene oxide is employed together with propylene oxide, it is appropriately used in excess, it being possible to use the two alkylene oxides as a mixture or one at a time.

Suitable carboxylic acids of the formula III, which can also be employed in the form of their derivatives having an acylating action, such as, for example, halides, anhydrides or esters, are preferably alkanemonocarboxylic or alkenemonocarboxylic acids having up to 22 carbon atoms, the term "alkenecarboxylic acid" also being intended to cover polyunsaturated compounds, such as occur, for example, in natural fatty acids.

Particularly preferred esterification products have a molecular weight of 500 to 10,000, preferably 500 to 5,000 and particularly 1,000 to 5,000, and have, relative to the total weight, an alkylene oxide content of 50 to 98%, preferably 70 to 96% and particularly 80 to 95%.

Preferably, at least half of all the terminal hydroxy groups present in the alkylene oxide chains are acylated, and, if p is other than 1, the product of n and p is preferably 25 to 300. However, as already stated above, the decisive factor in selecting the individual "structural units" of the compounds of the formula I is the spectrum of properties desired, that is to say, primarily, the balance between hydrophilic and hydrophobic groups, and particularly adequate solubility in water.

In particularly preferred esterification products of the formula I, A represents an alkylphenyl radical having alkyl radicals containing 3 to 16 carbon atoms or a novolac derived from such phenols and formaldehyde, X represents ethylene and R represents a radical of the formula V $$C_xH_{2x+1} \quad (V)$$

in which x is 0 to 22, or represents a radical of the formula VI $$C_yH_{2y-1} \quad (VI)$$

in which y is 2 to 22.

The compounds of the formula I are surface-active substances with an abundance of advantageous properties which make them particularly suitable for making preparations of water-insoluble colorants, above all pigments and water-insoluble dyestuffs, particularly vat dyestuffs and disperse dyestuffs. They make it possible to prepare, in accordance with the invention, highly concentrated liquid and powder formulations, of low dispersing agent content, of such colorants, the finely divided colorants having, in general, a particle size less than 5 μm, advantageously less than 3 μm.

The preparations of colorants known at the present time still have a number of disadvantages which are not shown by the colorant preparations according to the invention. Thus, for example, conventional preparations of disperse dyestuffs containing solely anionic dispersing agents cause an undesirable decrease in viscosity when mixing printing pastes with synthetic thickeners. Normally, as the content of dispersing agent in the milled or kneaded paste increases, the viscosity of the preparation also increases steeply, so that in unfavorable cases, above all at somewhat elevated temperatures, the formulations become highly viscose or even solid. On the other hand, the content of anionic dispersing agent cannot be reduced as desired, since unstable dispersions or dispersions which contain insufficiently finely dispersed particles from the outset are then often obtained.

In dye works, efforts are made for reasons of efficiency to have increasingly shorter liquor ratios in the dyebaths. Dyestuff formulations which are as highly concentrated as possible are preferred for this purpose. The high proportions of anionic dispersing agents in conventional disperse dyestuff preparations can lead to undesirable formation of foam in modern dyeing processes, such as jet dyeing. A considerable dyestuff retention, particularly in the case of pad dyeings, also gives rise to frequent complaints. In printing establishments, apart from the unfavorable effect on the viscosity of the printing pastes already mentioned, the high content of dispersing agent in conventional disperse dyestuff preparations also necessitates an involved rinsing of the prints.

The invention now makes it possible to produce colorant preparations which are not subject to the limitations mentioned and which are suitable, in particular, for a number of special purposes. Thus aqueous colorant dispersions according to the invention can be dried without loss of quality to give powders. Both the powders and the liquid formulations are excellently suitable for dyeing and printing a very wide variety of materials.

Further preferred embodiments of the invention are described in greater detail in the following text, in which, unless otherwise specified, percentages relate to weight.

Preferred preparations contain 5–90, in particular 10 to 80, % of colorant, 2 to 30, in particular 2 to 20, % of esterification product, up to 20, in particular up to 10, % of anionic dispersing agents and up to 70% of water and/or water-retention agents. In addition, the preparations according to the invention can contain auxiliaries customary in such preparations, for example hygroscopic agents, anti-foaming agents, anti-dust agents or preservatives. If these preparations contain further auxiliaries which are customary in such formulations, these auxiliaries can be added before, during or after the dispersing of the colorants.

If the preparations according to the invention contain anionic dispersing agents, the dispersing agents customarily used for this purpose are employed. Preferred dispersing agents are condensation products formed from aromatic sulfonic acids and formaldehyde, in particular condensation products formed from alkylnaphthalenesulfonic acids, above all methylnaphthalenesulfonic acids, and formaldehyde, such as are disclosed in German Patent specification No. 2,442,514. Condensation products formed from an optionally substituted phenol and formaldehyde and sodium bisulfite and also alkali metal salts of lignin sulfonic acids are also suitable.

Compared with conventional preparations of colorants, the preparations according to the invention are distinguished by having a very low content of surface-active substances.

In spite of the small quantity of surface-active substances, particularly of anionic dispersing agents, employed, the preparations according to the invention which are obtained are free-flowing in the form of a liquid formulation even at a very high content of colorant. In addition, the liquid preparations according to the invention are distinguished by very good stability on storage both at room temperature and at elevated temperatures. A further factor which should be singled out is the excellent redispersibility of the liquid and pulverulent preparations according to the invention.

Owing to their good compatibility with synthetic thickeners, the preparations can be employed in printing inks for roller printing with very "shallow" engravings, deeply colored prints being obtained. They can also be employed in rotary screen printing. The production of the preparations according to the invention can be effected by all the known processes. Preparations of colorants are produced by mixing the colorant or a mixture of colorants with one or more of the esterification products mentioned, if appropriate an anionic dispersing agent and, if appropriate, other additives, and subjecting the mixture to mechanical comminution. It is also possible to alter the sequence in which the components are added. The mechanical comminution is preferably effected in kneaders, ball mills, dispersing machines, bead mills, sand mills or attrition mills. A filter test or a microscope can be used to determine when the desired state of fine division of a particle size of, in general, about 5 $\mu$m, preferably <3 $\mu$m, has been reached. The preparations thus obtained contain the colorants in a stable, finely divided form.

The finely divided state is also retained if the product is stored for several weeks at room temperature or at 50° C.; nor is it impaired by the effects of cold.

A pulverulent preparation can be produced by drying aqueous preparations in a customary manner, for example by means of atomization drying. The pulverulent preparations thus obtained are readily redispersed by simply stirring into water or into solutions of binders.

As a result of the low content of surface-active substances, particularly anionic dispersing agents, no retarding action is produced when the colorant preparations according to the invention are employed in dyebaths or printing pastes, and brilliant color shades are obtained. In addition, in the case of direct printing, the rinsing necessary can be considerably shortened or even completely omitted if thickeners of low solids content are used, without the handle of the printed goods being adversely affected to a noticeable extent or the brilliance and color shade being impaired. In this case it is advantageous to adjust the pH of the preparations to a value of about 6 to 8.

Dyestuffs which sublime undecomposed, to the extent of at least 60%, between 150° and 220° C. under atmospheric pressure, in particular disperse dyestuffs belonging to the series comprising monoazo or disazo dyestuffs, anthraquinone, quinophthalone, nitro, azomethine, naphthalenetetracarboxylic acid or benzoxanthene dyestuffs or mixtures of such dyestuffs, are employed in a particularly preferred embodiment of the invention. The preparations thus obtained are suitable for the production of printing pastes for printing transfer papers for heat transfer printing.

In the examples which follow, unless otherwise specified, percentages and parts relate to weight.

EXAMPLE 1

375 parts of the dry dyestuff of the formula (1)

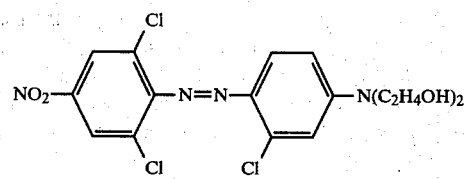

are ground with Siliquarzit beads in a bead mill, in a solution composed of 62.5 parts of an ethoxylated nonylphenol which has been esterified with formic acid and has a molecular weight of 1,600 and an ethylene oxide content of 85% (described in the following text as "nonionic dispersing agent I"), 12.5 parts of a sodium lignin sulfonate (described in the following text as "anionic dispersing agent A"), 65 parts of ethylene glycol, 3 parts of sodium zinc dithiocarbamate as a preservative and 300 parts of water. A dispersion in which over 90% of the particles are smaller than 3 μm is obtained after 5 hours. The preparation is made up to 1,000 parts with water and is separated from the beads. This gives a free-flowing dispersion which has a dyestuff content of 37.5% and is stable for a considerable time at room temperature or at 50° C.

EXAMPLE 2

400 parts of the dry dyestuff of the formula (2)

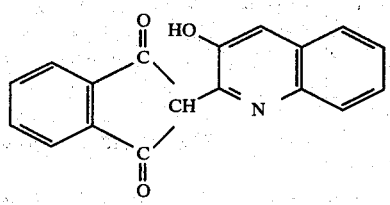

are ground with Siliquarzit beads in a bead mill, in a solution composed of 15 parts of the dispersing agent disclosed in Example D of German Patent Specification No. 2,442,514 (described in the following text as "anionic dispersing agent B"), 40 parts of an ethoxylated novolac resin which has been esterified with acetic acid and contains seven nonylphenol radicals linked via $CH_2$ bridges and has a molecular weight of approximately 6,300 and an ethylene oxide content of 73% (described in the following text as "anionic dispersing agent II"), 150 parts of ethylene glycol, 4 parts of sodium pentachlorophenolate as a preservative and 320 parts of water. A dispersion in which over 90% of the particles are smaller than 3 μm is obtained after 4 hours. The preparation is made up to 1,000 parts with water and the beads are removed by filtration. The preparation, which contains 40% of dyestuff, is stable on storage for several months at room temperature and at 50° C.

Free-flowing preparations which are stable on storage are also produced if the dyestuffs and dispersing agents indicated in the tables which follow are used instead of the components mentioned in Example 2, the procedure followed being in other respects analogous to Example 2.

| Example | Colorant Parts | Colorant No. | Nonionic dispersing agent Parts | Nonionic dispersing agent No. | Anionic dispersing agent Parts | Anionic dispersing agent No. | Grinding time (hours) | Ethylene glycol |
|---|---|---|---|---|---|---|---|---|
| 3 | 400 | 3 | 100 | VII | — | — | 5 | 200 |
| 4 | 300 | 4 | 150 | III | 10 | A | 7 | 100 |
| 5 | 300 | 4 | 100 | I | 20 | A | 6 | 100 |
| 6 | 350 | 6 | 80 | IV | 40 | A | 6 | 200 |
| 7 | 375 | 9 | 100 | VII | — | — | 6 | 150 |
| 8 | 300 | 7 | 120 | V | 25 | C | 7 | 150 |
| 9 | 400 | 5 | 60 | IV | 30 | B | 6 | 200 |
| 10 | 350 | 12 | 80 | III | 40 | B | 10 | 200 |
| 11 | 300 | 8 | 75 | I | 25 | A | 7 | 150 |
| 12 | 300 | 10 | 80 | VII | 15 | A | 5 | 200 |
| 13 | 350 | 13 | 120 | II | 20 | C | 6 | 200 |
| 14 | 300 | 7 | 80 | VII | — | — | 8 | 150 |
| 15 | 350 | 7 | 80 | I | 30 | A | 7 | 150 |
| 16 | 375 | 14 | 60 | II | 20 | C | 8 | 100 |
| 17 | 300 | 12 | 120 | V | 30 | A | 7 | 120 |
| 18 | 300 | 11 | 75 | VII | 35 | A | 8 | 200 |
| 19 | 400 | 2 | 80 | VII | — | — | 8 | 200 |
| 20 | 400 | 15 | 40 | VII | 20 | B | 3 | 200 |
| 21 | 450 | 16 | 40 | VII | 20 | B | 4 | 200 |
| 22 | 400 | 17 | 60 | III | 20 | C | 3 | 200 |

| Colorant No. | Formula | Color shade |
|---|---|---|
| 3 | (structure: bromo-hydroxy quinoline phthalide) | yellow* |
| 4 | $NO_2$—⟨⟩(CN)—N=N—⟨⟩—N($C_2H_4CN$)($C_2H_4$—⟨⟩) | red* |
| 5 | $NO_2$—⟨⟩($NO_2$)—N=N—⟨⟩—N($C_2H_5$)$_2$ | violet* |
| 6 | (structure: bis-benzoyl dithioethylene) | red* |
| 7 | (anthraquinone with $NH_2$, O-phenyl, OH) | red* |
| 8 | (anthraquinone with OH, NH-tolyl) | blue* | dispersed using 70 parts of the anionic dispersing agent D and 130 parts of the nonionic dispersing agent III and the dispersion is bead-milled with Siliquarzit balls in a ball mill. A dispersion in which over 90% of the particles are smaller than 3 μm is obtained after 4 hours. The milled paste is separated from the beads and is spray dried in an atomizing dryer at an inlet temperature of 180°–200° C. and an exit temperature of 70°–80° C. This gives a free-flowing powder which has a dyestuff content of 50% and which can be dispersed easily by stirring into a print thickener, an aqueous dyebath or an aqueous pad dyeing liquor.

EXAMPLE 24

783 parts of a moist presscake of the dyestuff of the formula (9), having a solids content of 40.7%, are bead-milled with 200 g of an aqueous solution containing 60 parts of the nonionic dispersing agent IV and 20 parts of the anionic dispersing agent D. A dispersion in which over 90% of the particles are smaller than 3 μm is obtained after grinding for a period of 6 hours. The dispersion is separated from the beads and is spray dried as in Example 23. This gives a powder which has a dyestuff content of 80% and has the advantageous properties mentioned in Example 23.

We claim:

1. Composition of matter comprising a colorant and a water-soluble compound of the formula I

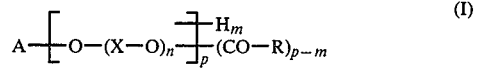

wherein A is an aryl radical, X represents identical or different groups of the formula —CH$_2$—CH$_2$— and —CH$_2$—CH(CH$_3$)—, R—CO— denotes identical or different radicals of a carboxylic acid having up to 22 C atoms, n represents identical or different numbers from 8 to 150, p is a number from 1 to 10 and m represents 0 up to (p-0.5).

2. Composition as claimed in claim 1, wherein A represents phenyl which is monosubstituted by a C$_3$–C$_{16}$-alkyl group or represents at least two such phenyl radicals, linked by CH$_2$ groups, R—CO represents the radical of an alkanecarboxylic or alkenecarboxylic acid having up to 22 C atoms, X is ethylene and the content of ethylene oxide, at a total molecular weight of 500–10,000, is 50 to 98% by weight.

3. Composition as claimed in claim 2, wherein the content of ethylene oxide, at a total molecular weight of 500–5,000, is 70–96% by weight.

4. Composition as claimed in claim 2, wherein the content of ethylene oxide at a total molecular weight of 1,000–5,000, is 80–95% by weight.

5. Composition as claimed in claim 1, wherein A represents phenyl which is substituted by one to three C$_3$–C$_{16}$-alkyl groups and R—CO represents the radical of an alkanecarboxylic or alkenecarboxylic acid having up to 22 C atoms, X is ethylene and the content of ethylene oxide, at a total molecular weight of 1,000–5,000, is 80–95% by weight.

6. Composition as claimed in claim 1, in which the colorant is a disperse dyestuff or a vat dyestuff having a particle size less than 3 μm.

7. Composition as claimed in claim 6, in which the colorant is a disperse dyestuff which can be sublimed undecomposed, to the extent of at least 60%, between 150° and 220° C. under atmospheric pressure.

8. Composition as claimed in claim 1, which contains 5–90% by weight of colorant, 2–35% by weight of compounds of the formula I, 0–20% by weight of anionic dispersing agents and 0–70% by weight of water and/or auxiliaries.

9. Composition as claimed in claim 1, which contains 10–80% by weight of colorant, 2–20% by weight of compounds of the formula I, 0–10% by weight of anionic dispersing agents and 0–70% by weight of water and/or auxiliaries.

* * * * *